(No Model.)

H. C. LOWRIE.
ROD JOINT OR COUPLING.

No. 317,154. Patented May 5, 1885.

Attest:
Philip F. Larner
Howell Bartle

Inventor:
Harvey C. Lowrie
By Wm C. Wood
Attorney.

UNITED STATES PATENT OFFICE.

HARVEY C. LOWRIE, OF DENVER, COLORADO.

ROD JOINT OR COUPLING.

SPECIFICATION forming part of Letters Patent No. 317,154, dated May 5, 1885.

Application filed September 10, 1884. (No model.)

*To all whom it may concern:*

Be it known that I, HARVEY C. LOWRIE, of Denver, in the county of Arapahoe and State of Colorado, have invented certain new and useful Improvements in Rod Joints or Couplings; and I do hereby declare that the following specification, taken in connection with the drawings furnished and forming a part of the same, is a clear, true, and complete description of my invention.

The object I seek to obtain is to provide a reliable metallic joint for rods, poles, and staves of various kinds, which will enable a large number of sections to be readily joined end to end, and enable the whole to be used as if it were a jointless rod or pole, and capable at its joints not only of resisting lateral or bending strains, but also longitudinal or tensile and torsional or rotative strains.

Although adapted for use in various connections, I have specially devised my rod-joints for use with devices for removing obstructions from drain-pipes and sewers which from their dimensions are inaccessible to laborers.

In apparatus of this kind it is desirable to employ rods or poles of moderate weight, but of great strength, and sometimes of great length, and as the work is performed either in a street-well or in a large sewer it is advisable that the rod-sections be seldom more than three feet in length, and whenever a large number thereof are to be connected the desirability of rigid joints is apparent, as well as such as can be readily connected and disconnected. To these ends I employ metallic ferrules or sockets adapted to receive and to be permanently attached to the ends of the wooden sections; but if said sections be of iron their ends can be integrally worked into suitable form for my purposes; and in either case the novel joint consists of a rectangular cross-head slotted at its rear or otherwise recessed, in combination with a cylindrical socket in diameter equal to the length of the cross-head, but having an entrance corresponding to the form of said head, so that when the two are placed together after the manner of a tenon and mortise and rotated, as hereinafter described, they will be firmly locked against lateral and longitudinal displacement, and in order to lock them against rotative displacement, as under torsional strains, the cross-head is provided with a spring-bolt, which engages with and projects through a hole in the wall of the socket, and as said bolt is accessible to pressure at its outer end it is thereby exposed to special manipulation preparatory to disconnecting the joints.

Figure 1:
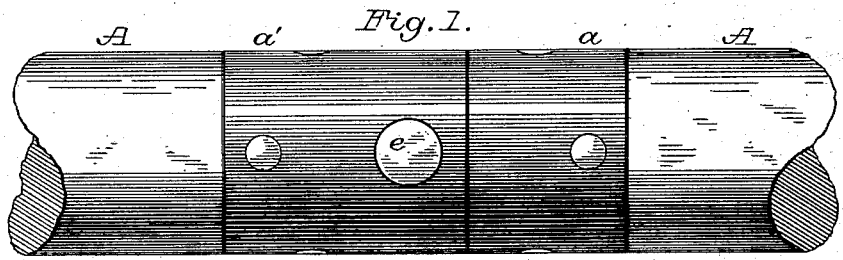
Figure 2:
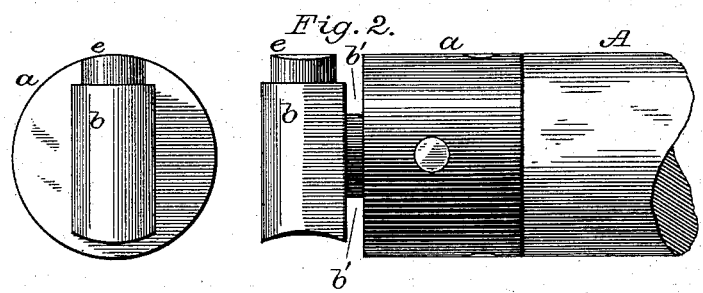
Figure 3:
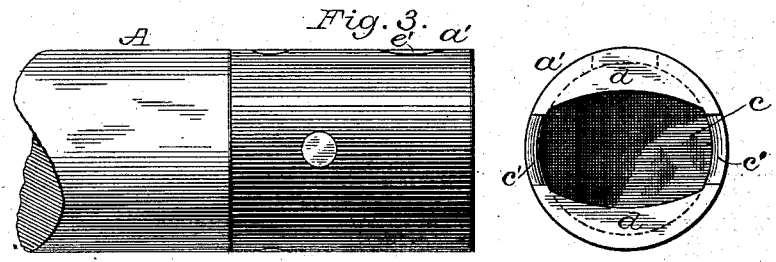
Figure 4:
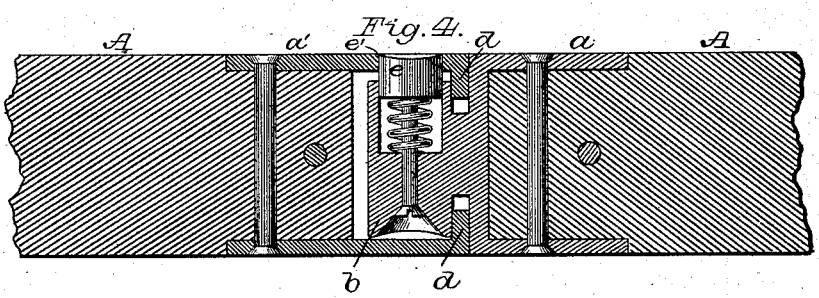

To further describe my invention, I will refer to the accompanying drawings, in which Figure 1 is a side view of one of my novel rod-joints as applied to wooden rod-sections. Fig. 2 is a side and end view of the cross-head portion of said joint. Fig. 3 is a side and end view of the socket portion thereof. Fig. 4 is a longitudinal central section of the joint as when coupled.

In each instance A denotes a wooden rod-section, and therefore the ferrules $a$ and $a'$ are employed for application to the two ends of each section, and they are united thereto by screws or bolts. As here shown, the ferrule $a$ has an integral head, on which the cross-head $b$ is integrally formed or otherwise rigidly attached thereto centrally. Said cross-head is substantially rectangular in cross-section, although its ends should be slightly rounded. Between the cross-head and the solid head of the ferrule the metal is cut away, or the cross-head and its stem are so constructed as to afford the intervening slots, $b'\ b'$. The ferrule $a'$ is partially closed at its outer end, or, in other words, instead of having a circular opening, it has an integral head cut away across its center to afford an opening, $c$, which corresponds in outline to the lateral cross-section of the cross-head, and to also afford the side webs or flanges, $d$, which should be of a thickness a trifle less than the width of the slots $b'\ b'$ at the rear of the cross-head. The end of the ferrule $a'$ at the two ends of the opening $c$ are beveled or chamfered, as at $c'$.

As thus far constructed, it will be seen that if the cross-head be inserted longitudinally into the opening $c$ and then rotated, say, ninety degrees, that each of the webs $d$ will interlock with the cross-head, because each will occupy its respective slot $b'$, and thereby thoroughly secure the two parts together as against lateral and longitudinal strains, thus rendering the joints suitable for use in most instances where mere drawing and thrusting movements are involved.

In operating upon drain-pipes, however, a rotative strain is involved, as well as thrusting and drawing strains, and therefore I have inserted into the cross-head a spring-bolt, $e$, which normally projects from one end thereof to the extent of the thickness of the metal of which the ferrule $a'$ is composed, and for a keeper to said bolt when in service said ferrule $a'$ has a hole, $e'$, in one side thereof, so that when the cross-head has been properly turned said bolt is forced by its spring into its keeper, thus requiring its depression by special manipulation before the sections can be separated. A joint of this character can be relied upon for carrying an earth-auger for vertical or lateral tubular excavation, its strength being sufficient for working small tools in light soils; but as such service usually involves heavy rotative strains I have devised a joint of different construction, which, although suited for general service, is specially adapted to extraordinary rotative strains, and said other joint constitutes the subject of a separate application for Letters Patent.

Having thus described my invention, I claim as new and desire to secure by Letters Patent—

1. The combination of the rectangular cross-head slotted at its rear, and the socket having an entrance conforming to the shape of the cross-head, and provided at each side of said entrance with webs for occupying the slots at the rear of said cross-head, substantially as described, whereby when said cross-head is entered into said socket and partially rotated said webs will pass to the rear of the cross-head and interlock therewith.

2. The combination of the rectangular cross-head slotted at its rear, the spring-bolt therein, and the socket provided with webs at the sides of its entrance, and with a hole through its side to serve as a keeper for said bolt, substantially as described.

HARVEY C. LOWRIE.

Witnesses:
ANDREW RYAN,
J. S. LITTELL.